United States Patent
Derks

(10) Patent No.: US 6,643,283 B2
(45) Date of Patent: *Nov. 4, 2003

(54) COMMUNICATION NETWORK

(75) Inventor: Frank P. Derks, Hilversum (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,851

(22) Filed: Aug. 12, 1998

(65) Prior Publication Data

US 2003/0002475 A1 Jan. 2, 2003

(30) Foreign Application Priority Data

Aug. 13, 1997 (EP) ............................................. 97202504

(51) Int. Cl.[7] ........................... H04L 12/66; H04L 12/56
(52) U.S. Cl. ........................................ 370/352; 370/401
(58) Field of Search ................................ 370/352, 356, 370/401, 353, 354, 410, 522

(56) References Cited

U.S. PATENT DOCUMENTS

| 5,608,786 A | * | 3/1997 | Gordon | 379/100 |
|---|---|---|---|---|
| 5,726,984 A | * | 3/1998 | Kubler et al. | 370/349 |
| 5,751,706 A | * | 5/1998 | Land et al. | 370/352 |
| 5,889,774 A | * | 3/1999 | Mirashrafi et al. | 370/352 |
| 5,907,547 A | | 5/1999 | Foladare et al. | 370/352 |
| 5,907,610 A | | 5/1999 | Onweller | 379/242 |
| 6,028,917 A | | 2/2000 | Creamer et al. | 379/100 |
| 6,064,653 A | * | 5/2000 | Farris | 370/237 |
| 6,069,890 A | * | 5/2000 | White et al. | 370/352 |
| 6,078,582 A | * | 6/2000 | Curry et al. | 370/356 |
| 6,088,430 A | | 7/2000 | McHale | 379/93.28 |
| 6,192,045 B1 | * | 2/2001 | Williams et al. | 370/352 |
| 6,236,653 B1 | * | 5/2001 | Dalton et al. | 370/352 |

* cited by examiner

*Primary Examiner*—Chau Nguyen
*Assistant Examiner*—Soon-Dong Hyun

(57) ABSTRACT

A communication network including a first terminal is disclosed that is arranged for communication with a second terminal via a packet switched network. The first terminal is connected via a first gateway to the packet switched network, and the second terminal is connected via a second gateway to the packet switched network. The first gateway is arranged to receiving information from the second terminal that is to be connected without answering the call of the first terminal. This prevents calling costs from being incurred when transferring the information of the terminal to be called. The gateways may wait in answering the call of the first terminal until the second terminal has answered the call.

11 Claims, 3 Drawing Sheets

COMMUNICATION NETWORK

FIELD OF THE INVENTION

The present invention relates to a system comprising a terminal coupled via a dial-up network to a gateway, the terminal comprises means for dialing the gateway and providing an identification of a second terminal connectable to said gateway.

To enable communication between existing telephony systems and emerging IP-based telephony 'devices" (E.g. an Internet Telephony software package running on a PC) as well as the communication between existing telephony systems inter-connected via IP-based networks, so-called Telephony Gateways (hereafter called gateway(s)) are used. These gateways connect to an IP-based network (such as the public Internet and private Intranets) on one side and a telephone network (E.g. PSTN/ISDN/GSM) on the other side and provide the necessary conversion functions to transmit and receive voice-band and control data on either network.

Because of the differences in addressing structure on both sides of the gateway and because of the nature of some of the telephone networks, connections initiated from the telephone network side are usually set up by a two-step dialing process. First, a gateway is called and this gateway answers the call to obtain an identification of the second terminal, which can be constituted by additional addressing information for either an IP-based telephony device (E.g. an IP-address) or addressing information for the combination of a remote gateway and a remote (normal) telephony terminal. Second, the gateway uses this addressing information to attempt to set up a call to the 'remote' telephony device, which can either be an IP-based telephony device or a regular telephony device connected (directly or indirectly) to a remote gateway.

The problem with this approach is that a call is answered by the gateway, to obtain numbering information, before it is known whether the actual destination will answer the call. The caller will thus pay the bill for a call that may never exist and always pay for a duration that is longer than the actual call, when it takes place.

SUMMARY OF THE INVENTION

An object of the present invention is to provide a communication network according to the preamble in which the above problem is solved.

For achieving said object the communication network according to the invention is characterized in that the gateway is arranged for receiving the identification of the second terminal without answering the call.

When the gateway is arranged for receiving the identification of the second terminal before answering a call, no calling costs are incurred for transferring the identification of the second terminal. This can e.g. be done by using the signaling possibilities of ISDN. On ISDN interfaces complying with the ITU-T Q.931 Recommendation, calls are initiated by the transmission of a 'setup" message from the calling to the called party (from the calling user to the network to be precise). Such a 'setup' message contains mandatory information elements and may contain optional information elements. The 'called party number', 'called party subaddress' and 'keypad facility" information elements are three of these optional information elements. They (may) contain, when present, numbering and addressing information about the called terminal. It is observed that it is also possible to use ISDN interfaces which are derived from the Q.931 Recommendation, such as EURO-ISDN.

An embodiment of a communication network according to the invention is characterized in that the gateway is arranged for establishing communication with the second node, and in that the gateway is arranged for answering the call of the terminal after the second terminal has been contacted.

In this way it is obtained that the caller does not incur calling cost until the destination really answers the call, and that the behavior of the destination telephony device, as seen from the caller in the telephone network, is identical to the behavior of a destination telephony device that is located in and reached through the telephone network.

BRIEF DESCRIPTION OF THE DRAWING

The invention will now be explained with reference to the drawing figures.

DETAILED DESCRIPTION OF THE PREFERRED EMBODIMENTS

Figure 1:
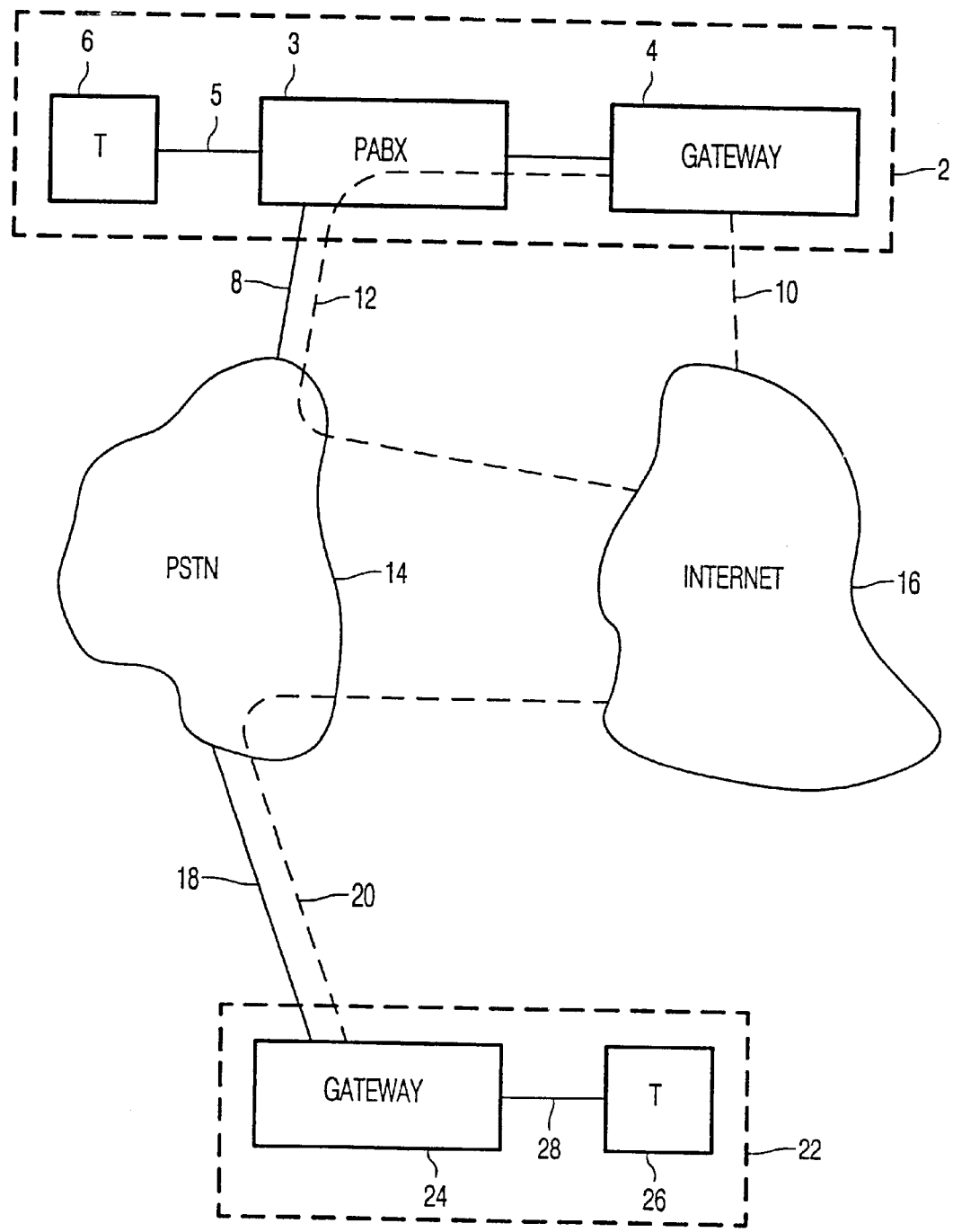
FIG. 1 shows a communication network according to the invention.

In the communication network according to FIG. 1, a node 2 comprises a gateway 4 to which a telephone terminal 6 can be connected via a telephone switch which is here a PABX 3. It is however possible that the telephone switch is a switch in the public telephone network. The gateway 4 is connected to a telephone network 14 via a link 8 which is routed via the PABX 3. The gateway 4 is also connected to the packet switched network 16 which can be the public Internet. Alternatively the connection of the gateway 4 to the packet switched network 16 can be a dial up connection or a leased line 12 routed via the PABX 3 to the telephone network 14 as is indicated by the dotted line.

The connection 5 between the terminal 6 and the gateway 4 can be a telephone line which is connected via the PABX 3 to the gateway 4, but it is also possible that the functions of the gateway 4 and the terminal 6 are included in a single device, such as a personal computer or a telephone terminal specially arranged for Internet telephony.

When the terminal 6 is connected to the gateway 4 via the PABX 3, the terminal 6 initiates a call by going off hook and dialing a number corresponding to the gateway 4. The gateway 4 accepts the call and the terminal 6 provides the (IP) address of the gateway 24 and the terminal 26 to be called to the gateway 4. If only one terminal is connected to the gateway 24 to be called, which is the case when the gateway function is integrated in a PC or in a special internet phone device, only the internet address of the gateway 24 is given.

According to the present invention, the gateway 4 does not answer the call initiated by terminal 6, but that it only reads the numbering/addressing information in the 'called party number', "called party subaddress" and/or 'keypad facility' information elements which could be included in an ISDN set up message.

Alternatively, it is also possible that the address information of the terminal to be called is stored in the PABX, and that a normal telephone number is assigned to said terminal. If said number is called, the PABX retrieves the complete address information and tries to contact the terminal via the packet switched network before answering the call of the calling terminal.

After having received the address of the terminal 26 to be called from the terminal 6, the gateway 4 attempts to contact the gateway 24 in the node 22 via the Internet 16. If this attempt is successful, the addressing information of the terminal 26 is passed via the Internet 16 to the gateway 24, which tries to set up a connection with the terminal 26 via the link 28. When the terminal 26 accepts the connection, this is signalled by the gateway 24 to the gateway 4, after which a connection between the terminal 6 and the terminal 26 is established.

If the attempt of the gateway 4 to contact the gateway 24 via the Internet 16 fails, it is assumed that the gateway 24 is not connected to the Internet 16. In that case, the gateway 4 calls the gateway 24 directly via the PSTN using a telephone number stored locally, in order to request that the gateway 24 connects to the Internet 16. After the request has been transmitted, the gateway 4 directly terminates the connection with the gateway 24, in order to minimize the connection costs. Alternatively the request to connect to the internet can be included in an ISDN set up message which will be passed by the PSTN to the gateway 24 before a call is established. The latter possibility has the advantage that no connection costs are incurred at all. In response to this request, the gateway 24 connects to the Internet 16. In general this will be done via a dial up connection over the PSTN 14 via the link 18.

It is observed that it is also possible to pass the address of the calling terminal/gateway combination to the gateway during the request to connect to the packet switched network. This has the advantage that the gateway 24 directly can call the gateway 4 after it has connected to the packet switched network 16. It is thereby prevented that the calling gateway has to wait a before contacting the called gateway over the packet switched network until it is ensured that the called gateway has connected to the packet switched network. Because this waiting time is not known, the calling gateway has to wait longer than is necessary.

If the gateway 4 is connected to the Internet 16 via a dial up connection over the telephone network 14 when the gateway 24 should be called directly, the call to the Internet 16 is terminated and the gateway 24 is called. After having transmitted the request to connect to the internet 16 to the gateway 24 the gateway 4 connects again to the Internet 16 and again tries to contact the gateway 24 for establishing a call between the terminals 6 and 26. If the gateway 4 has a fixed connection 10 to the Internet or when is has more than one line 12 available to the PSTN 14, it can stay connected to the Internet 16 when calling the gateway 24 directly.

Figure 2:
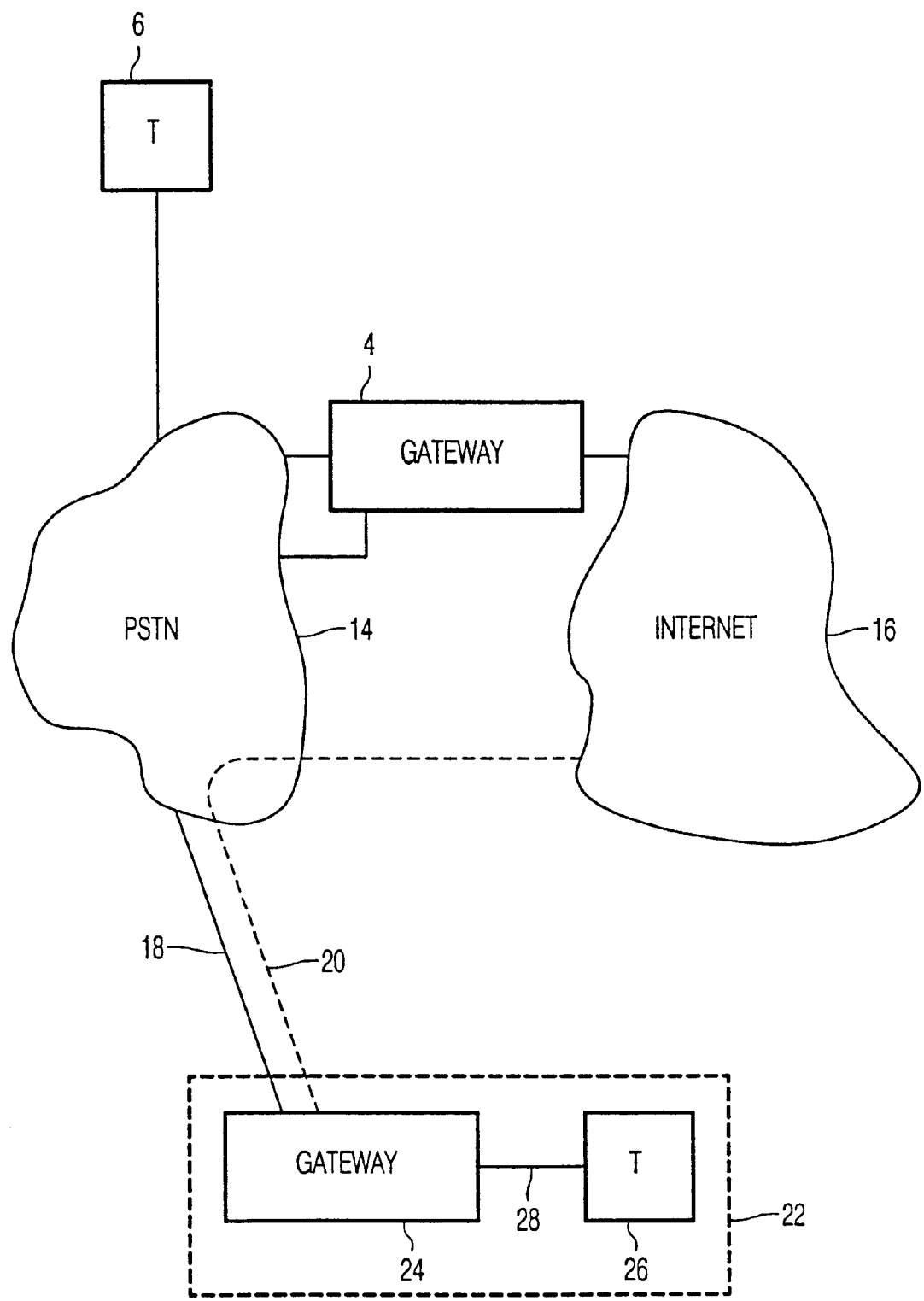
FIG. 2 shows an alternative arrangement of the communication network according to the invention.

In the network according to FIG. 2, the gateway 4 is present between the PSTN network 14 and the Internet 16. If the terminal 6 wants to contact the gateway 4 in order to contact a terminal 24 via the Internet 16, it dials the phone number of the gateway 4 to make a connection. In the present proposal the gateway does not answer calls to obtain information about the actual destination of the call, but uses the numbering/addressing information in the 'called party number', "called party subaddress" and/or 'keypad facility' information elements. The gateway uses this numbering information to set up a call to the destination terminal 26. The destination telephony device 26 or the combination of a destination gateway and a (directly or indirectly) connected normal telephony device have a means of identifying and indicating that the telephony device is in the alerting state. The gateway sends an 'alerting" message to the caller or network when it is informed that the IP-based telephony device or the normal telephony device behind a gateway is in the alerting state. The caller has a means of supplying the required addressing/numbering information and place that information in the 'called party number', 'called Party subaddress' information elements' and/or 'keypad facility' information elements.

A first advantage of this way of setting up a call is that the caller does not incur calling cost until the destination really answers the call. A second advantage is that the behaviour of the destination telephony device, as seen from the caller at the terminal 6 is identical to the behaviour of a destination telephony device that is reached directly through the telephone network.

Figure 3:
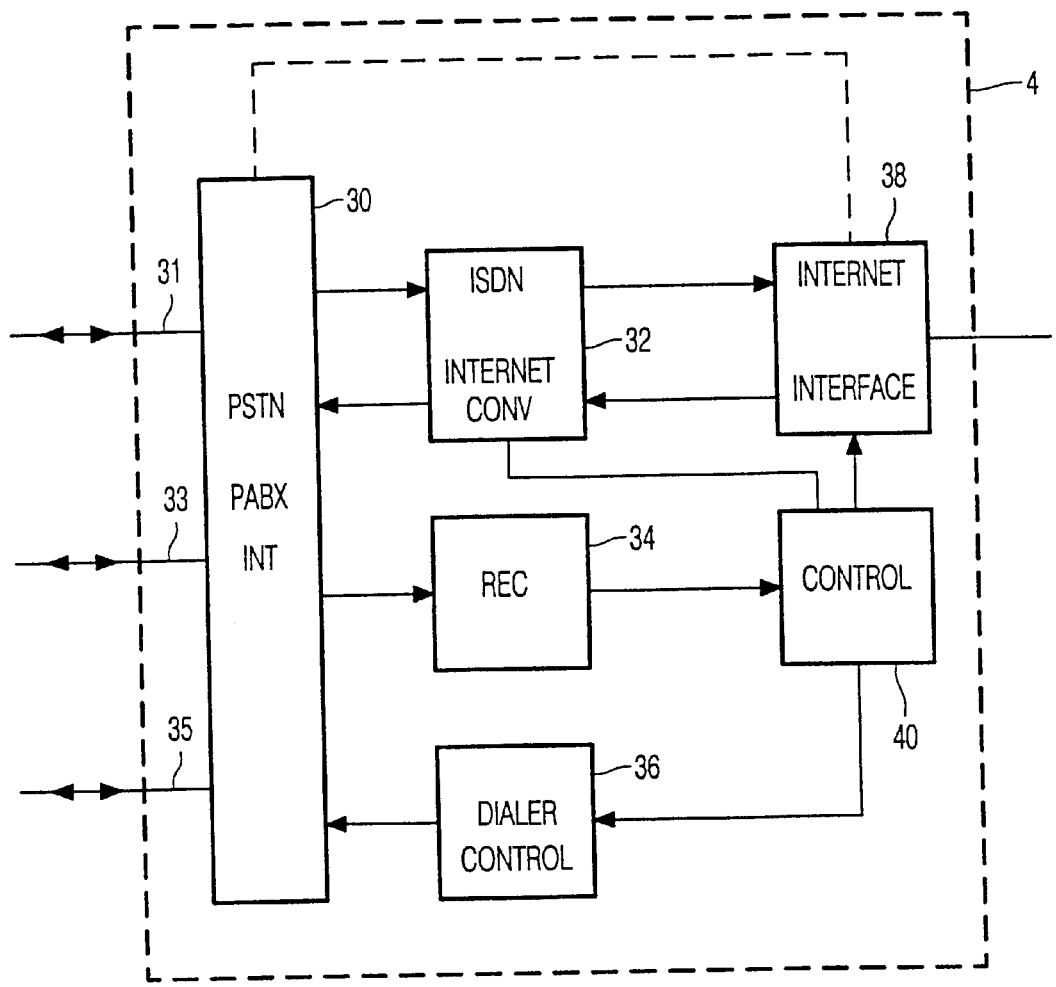
FIG. 3 shows a block diagram of a gateway according to the invention.

The gateway 4 according to FIG. 3 comprises an interface 30 for interfacing to the PABX 3 or to a local exchange of the PSTN. The interface 30 is connected to a plurality of telephone lines 31, 33 and 35. It is also possible that the interface 30 is connected to the PABX or the PSTN via an E1 (Europe) or T1 (US, Japan) line.

The interface 30 is connected via a protocol converter 32 to an Internet interface 38. The protocol converter 32 is arranged for converting the speech signal and the associated control signals received from the interface 30 into signals which can be transmitted via the Internet. Furthermore the protocol converter 32 is arranged for converting the signals received from the Internet into signals which can be transmitted via the telephone interface 30. The conversion of the signals from the interface 30 to signals to be transmitted over the Internet interface 38 involves speech compression and packetizing the compressed speech signals into packets for transmission over the Internet. If the interface 30 is connected to an analog telephone network, the protocol converter 32 also performs analog to digital conversion. The conversion of the signals from the interface 38 to the signals for the interface 30 involves depacketizing the packets received from the interface 38 into a signal stream, and decompressing the signal stream into a digital speech signal. If the interface 30 is connected to an analog telephone network, the digital speech signal is also converted to an analog signal.

The internet interface 38 can be fixedly connected to the Internet, but it is also possible that the Internet interface 38 is connected to the telephone interface 30, in order to connect to the Internet via a dial up connection.

The interface 30 is also connected to a control signal receiver 34 which is arranged for receiving the control signals associated with a connection to the telephone network. If the interface 30 is connected to an analog telephone network, the control signal receiver 34 comprises a tone detector for detecting various signalling tones received from the telephone network and converting them into a corresponding control message. If the telephone interface 30 is connected to an ISDN telephone network, the control signal receiver 34 is arranged for extracting several control messages from the control signals received from the telephone network. Examples of such control messages can e.g. be addressing information carried in an ISDN set up message as explained above.

The control signals at the output of the control signal receiver 34 are passed to a controller 40 which interprets the control signals and takes appropriate actions by sending control signals to a dialler/control signal transmitter 36, to the protocol converter 32 and to the internet interface 38.

If the gateway 4 receives via the interface 30 a set up message including the address information of a terminal to be called via the internet, the control signal receiver 34 extracts the address information from the set up message and passes it to the controller 40. The controller 40 requests the internet interface 38 to set up a (virtual) connection between said internet interface 38 and the gateway identified with the internet address carried by the set up message. After the connection has been set up, optionally a terminal identification signal is transmitted over the connection in order to address one out of more terminals connected to the remote gateway. The remote gateway signals the status of the remote terminal (alerting, in use, off hook) via the Internet interface to the controller 40. If the remote terminal goes off hook, the controller 40 instructs the dial/control interface 36 to accept the telephone call corresponding to the previously received set up message. Furthermore the protocol converter 32 is instructed to pass the converted signals from the telephone interface 30 to the Internet interface 38 for transmission to the remote gateway.

If the called terminal does not answer the call, the gateway 4 does not answer the call of the calling terminal. This way of dealing with the incoming call has the advantage that no calling costs are incurred before the remote terminal actually answers the call.

If the attempt to contact the remote gateway fails, the controller 40 instructs the dial/control interface 36 to dial the telephone number of the remote gateway in order to request that the remote gateway connects to the Internet. Subsequently the gateway 4 tries again to connect to the remote gateway via the Internet.

If the gateway 4 does not have a fixed connection to the internet, it should connect to the internet via a dial up connection. In that case, the control signal receiver 34 is arranged for receiving a message from a remote gateway requesting the gateway 4 to connect to the internet. In response to said request the controller instructs the dial/control interface 36 to establish a dial up connection to the Internet.

What is claimed is:

1. A communication system comprising:

a first gateway; and a first terminal coupled via a dial-up network to the gateway, the terminal includes a controller for dialing the first gateway and providing an identification of a second terminal connectable to the first gateway via a second gateway, the identification providing data for making a call to the second terminal, wherein the first gateway receives the identification of the second terminal without answering the call initiated by the first terminal by using numbering/addressing information and attempts to contact second gateway via the Internet, wherein after a predetermined period/number of unsuccessful attempts to contact the second gateway via the Internet, the first gateway contacts the second gateway via PSTN to request that the second gateway connect to the Internet, and wherein the second gateway does not answer the PSTN attempted call from the first gateway, but reads numbering/address data that identifies the first gateway, and the second gateway contacts the first gateway via the Internet.

2. The communication system according to claim 1, wherein the first gateway establishes communication with the second terminal via the second gateway, and answers the call of the first terminal only after contact with the second terminal has been established.

3. A source gateway comprising:

an interface for receiving from a first terminal an identification of a second terminal to be contacted by said source gateway, the identification providing data for making a call to the second terminal via a second destination gateway;

wherein the source gateway receives the identification of the second terminal to be contacted without answering the call from the first terminal until a connection between the destination gateway and the second terminal is established, wherein in a first instance the source gateway attempts to contact the destination gateway via the Internet, and after a predetermined period/number of attempts, the source gateway attempts to contact the destination gateway via PSTN, and wherein the destination gateway does not answer the PSTN attempted call from the source gateway, but reads numbering/address data that identifies the source gateway, and the destination gateway contacts the source gateway via the Internet.

4. The source gateway according to claim 3, wherein after the source gateway establishes communication with the second terminal via the destination gateway, the source gateway answers the call of the first terminal.

5. A Communication method comprising the steps of:

dialing a first gateway from a first terminal via a dial up network, providing an identification of a second terminal connectable to the first gateway via a second gateway; and receiving the identification of the second terminal by the first gateway without answering the call from the first terminal until a connection between the first gateway and the second terminal is established via the second gateway;

if attempts to contact the second gateway are unsuccessful via the Internet, contacting the second gateway via PSTN, wherein once the second gateway has been contacted via PSTN, the first gateway disconnects the PSTN connection in favor of an Internet connection with the second gateway, and wherein the contact of the second gateway by the first gateway via PSTN does not include said second gateway answering the call, wherein said second gateway reads numbering/address data contained in the PSTN message and identifies and contacts the first gateway via the Internet.

6. A Communication method according to claim 5, further comprising the steps of establishing communication with the second terminal; and answering the call of the first terminal after the second terminal has been contacted.

7. The communication system according to claim 1, wherein the first gateway attempts to contact the second gateway via the Internet using an ISDN set up message.

8. The communication system according to claim 1, wherein after the predetermined period/number of unsuccessful attempts to reach the second gateway, the first gateway contacts the second gateway via PSTN, then the first gateway disconnects the PSTN connection with the second gateway in favor of an Internet connection with the second gateway.

9. The source gateway according to claim 3, wherein in the first instance the source gateway attempts to contact the destination gateway via the Internet using an ISDN set up message.

10. The source gateway according to claim 3, wherein after the predetermined period/number of unsuccessful attempts to reach the destination gateway, the source gateway contacts the destination gateway via PSTN, said source gateway then disconnects the contact with the destination gateway via PSTN in favor of an Internet connection with the destination gateway.

11. The method according to claim 5, further comprising that the attempt to connect the first gateway with the second terminal via the second gateway is first performed via an ISDN set up message.

* * * * *